A. Tuttle,
Plant Protector.

No. 98,645.        Patented Jan. 4, 1870.

Witnesses.
Chas. H. Poole.
Reuason Thomson

Inventor.
Abel Tuttle.
by Prindle & Dyer
Attys.

United States Patent Office.

ABEL TUTTLE, OF MANNSVILLE, NEW YORK.

Letters Patent No. 98,645, dated January 4, 1870.

IMPROVEMENT IN PLANT-PROTECTOR.

The Schedule referred to in these Letters Patent and making part of the same

*To all whom it may concern:*

Be it known that I, ABEL TUTTLE, of Mannsville, in the county of Jefferson, and in the State of New York, have invented certain new and useful Improvements in Vegetable-Shields, &c.; and do hereby declare that the following is a full, clear, and exact description thereof, reference being had to the accompanying drawing, making a part of this specification, in which—

Letters of like name and kind refer to like parts in each of the figures.

Figure 1:
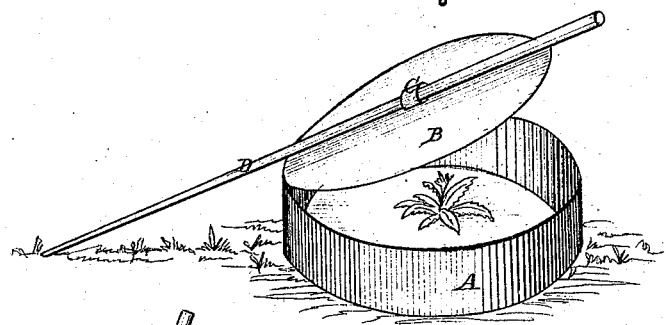
Figure 1 is a perspective view of my improved device.
Figure 2:
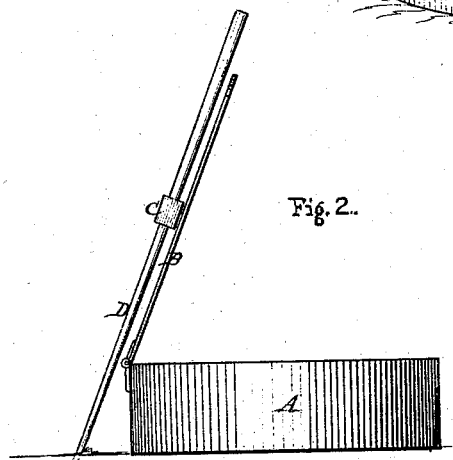
Figures 2 and 3 are a side and a front elevation, respectively, of the same.
Figure 3:
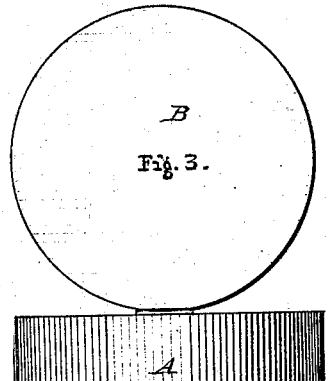
Figure 4:
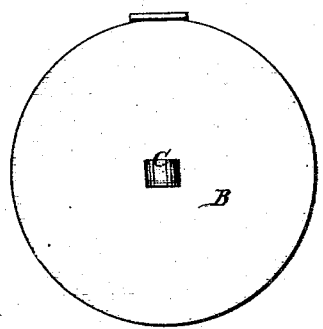
Figure 4 is a plan view of its upper side.

The design of my invention is to furnish a cheap, portable device for partially or entirely covering plants, in order, that while young or during inclement weather, they may be protected from bugs, frost, high winds, and hail; and to this end, It consists in the employment of a hoop or short hollow cylinder, having hinged to its upper end a cover, in the centre of which is a loop, or its equivalent, for the reception of a supporting-stake, as is hereinafter set forth.

In the annexed drawing—

A represents a short hollow cylinder, constructed, preferably, of thin wood, although metal may be employed for this purpose, if desired.

Hinged at one edge to the top of the cylinder A, is a cover, B, corresponding in size and shape therewith, so that when resting thereon, said end is entirely closed.

Secured to the upper side of the cover B, at its centre, is a loop, C, through which passes a stake, D, having its lower end embedded in the ground, for the purpose of holding said cover in an elevated position.

As thus constructed, the device is complete, and is used as follows:

The hoop or cylinder A being placed around the plant, and its lower edge slightly embedded within the ground, the cover B is thrown back, except when necessary to protect said plant from frost, hail, or wind, in which event it is adjusted to and secured at the desired angle, by means of the stake D.

If desired, the cover may be made of tin or other polished metal, so that by adjusting its inner face toward the sun, the heat from the latter may be reflected upon the plant, and, by such addition to the direct rays of the sun, insure a sufficient amount of warmth to enable the plant to thrive during the early days of spring.

It is designed to construct this device of such cheap material as to enable it to be sold at a very small price, and thus be brought within reach of all; and being a sure protection against all enemies of plants or vegetables, so that by its use from one to two months' time can be gained in raising the same, it is believed that its introduction will prove a public benefit.

Having thus fully set forth the nature and merits of my invention,

What I claim as new, and desire to secure by Letters Patent, is—

The hereinbefore-described vegetable-shield, consisting of the hoop A and cover B, the latter provided with the loop C, or its equivalent, in combination with the stake D, substantially as and for the purpose specified.

In testimony that I claim the foregoing, I have hereunto set my hand, this 6th day of December, 1869.

ABEL TUTTLE.

Witnesses:
 JNO. B. BAKER,
 A. L. BAKER.